Sept. 1, 1925.

H. S. HART 1,551,991

DOOR OPERATING MECHANISM

Filed Aug. 4, 1921

Witness:
G. Burkhardt.

Inventor:
Harry S. Hart,
By Wilkinson Huxley Byron & Knight
Attys.

Sept. 1, 1925.

H. S. HART 1,551,991

DOOR OPERATING MECHANISM

Filed Aug. 4, 1921　　2 Sheets-Sheet 2

Witness:
R. Burkhardt

Inventor:
Harry S. Hart,
By Wilkinson, Huxley, Byron & Knight
Attys.

Patented Sept. 1, 1925.

1,551,991

UNITED STATES PATENT OFFICE.

HARRY S. HART, OF CHICAGO, ILLINOIS.

DOOR-OPERATING MECHANISM.

Application filed August 4, 1921. Serial No. 489,699.

*To all whom it may concern:*

Be it known that I, HARRY S. HART, a citizen of the United States, residing at Chicago, in the county of Cook and State of Illinois, have invented certain new and useful Improvements in Door-Operating Mechanism, of which the following is a specification.

This invention relates to dump cars and especially to that type of dump car used for the ballasting operation, and has for its special object to provide a car of this type in which the contents may be deposited either between the rails or outside the rails, as may be desired, without flooding them.

It is an additional object to provide a single operating mechanism for simultaneously opening both of two series of doors to dump between the track when desired. Other and further objects will appear as the description proceeds.

In the embodiment of my invention selected for illustration, I have shown a car having the underframe comprising the usual center sill and cross sills and having between the trucks my improved dumping arrangement. The construction at the ends of the car I have not shown, though it will be understood that this may be of the well known Hart convertible car type.

My invention as shown comprises an arrangement of parts which in one position form a longitudinally extending center dump hopper between the trucks for depositing the material between the rails, but which may be operated to deposit the material outside the rails when this operation is desired. The construction comprises fixed downwardly sloping portions forming the upper part of a hopper and horizontal doors closing the space between the lower ends of said fixed portions and the center sill, these doors being composed of frame members having doors hinged therein.

In a preferred form, the frame members are pivoted adjacent the center sills and the inner members are pivoted in the frame members at a point in line with the outer edge of the floor openings. The frame member operating means are separate upon each side of the car, as in side dumping it is often desirable to dump on one side only. The inner members are controlled by a single operating means, since the doors open toward each other and will dump all material between the rails.

I have illustrated a preferred embodiment of my invention in the accompanying drawings, in which—

Figure 1:
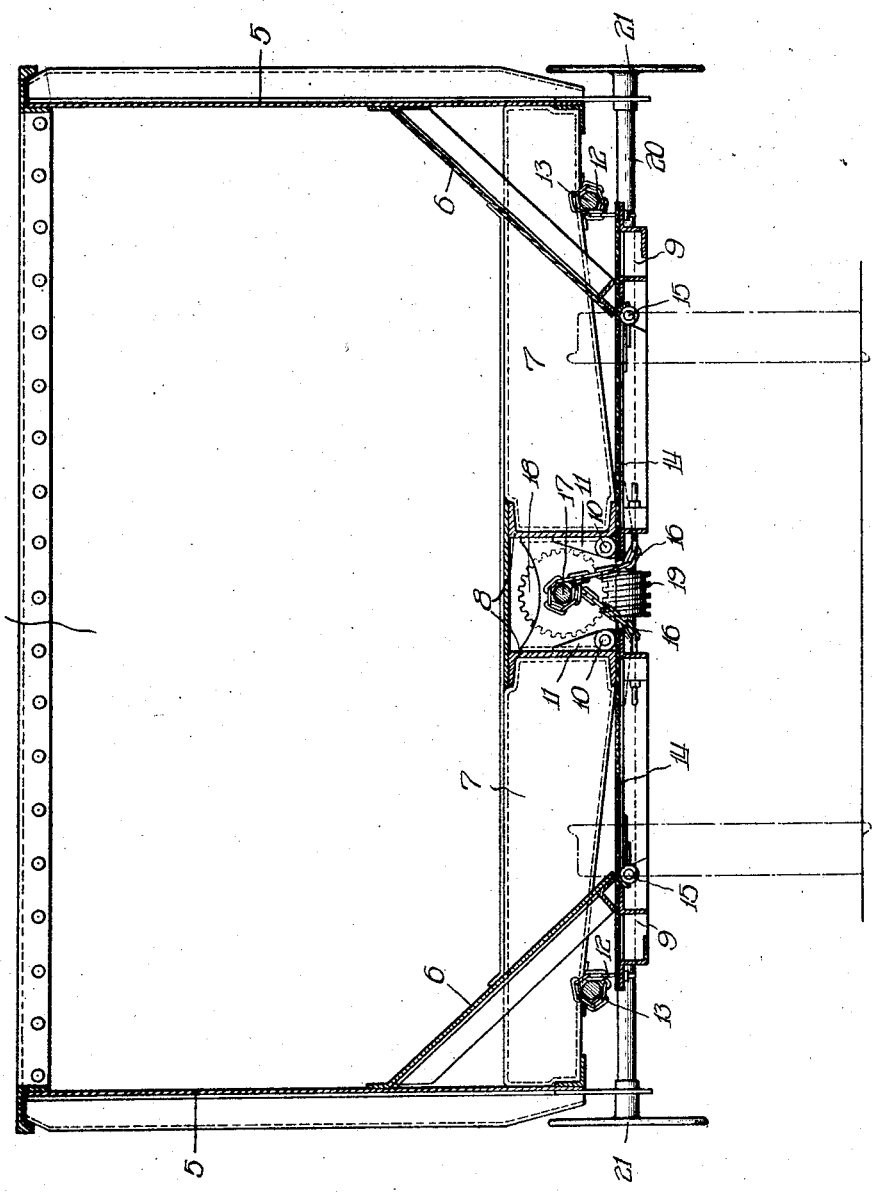
Figure 1 is a cross section of a car equipped with my invention, the doors being closed.

As shown in the drawings, the car comprises the ends 4, sides 5, inwardly sloping side members 6, bolster 7, and center sills 8. The doors are located upon either side of the center sills, and comprise the frame member 9, which is hinged at 10 to the pivot block 11, the latter being connected to the center sills. The frame member extends beyond the opening between the floor portion 6 and the center sills 8 and to this extended portion is connected the chain 12. The other end of the chain 12 is connected to the rotatable operating shaft 13. The inner door member 14 is pivoted to the frame member at 15, which pivot is substantially below the inner edge of the sloping floor portion 6. The inner end of the inner member 14 extends under the pivot 10. The chain 16 is connected to this inner end and the other end of the chain is connected to the centrally operating shaft 17. As clearly shown in the drawings, the chains 16 and members 14 upon each side of the center sills are both connected to the single shaft 17.

As best shown in Figure 1, shaft 17 carries the gear wheel 18 which is in mesh with the worm gear 19 upon the transverse shaft 20. This shaft 20 is provided at either side of the gear with hand wheels 21. Any suitable mechanism (not shown) may be provided for rotating the shafts 13.

Figure 2:
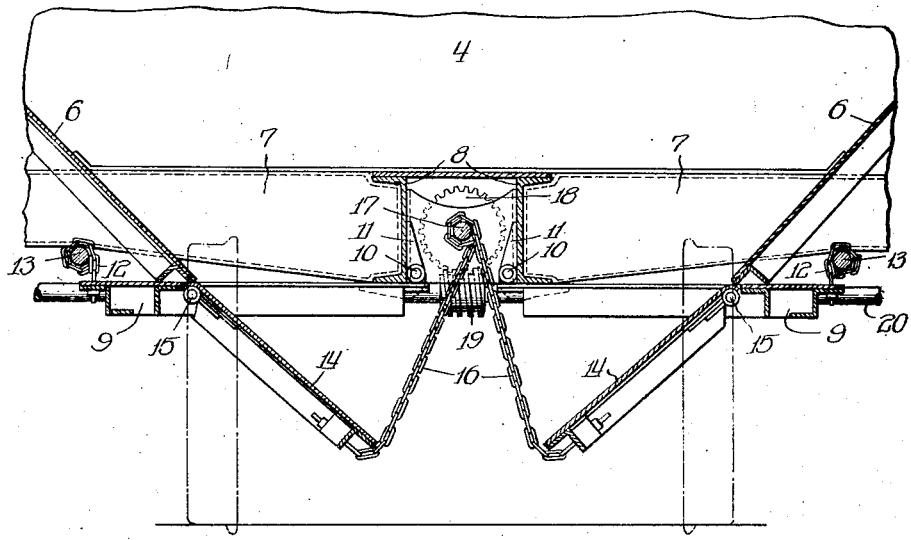
Figure 2 is a view similar to Figure 1, but on a slightly smaller scale, the inner door members being open.

As best shown in Figure 2, rotation of the shaft 17 in the clockwise direction serves to unwind both chains 16 and thus simultaneously release both doors 14. These doors 14 swing about their pivots 15 until approximately in line with the floor portion 6. The frame door members 9 are retained in place by their respective chains 12. Rotation of the shaft 17 in the counterclockwise direction again draws both door members 14 to their closed position. It will be observed that in the open position of the doors 14, material from the car is directed well within the rails.

Figure 3:
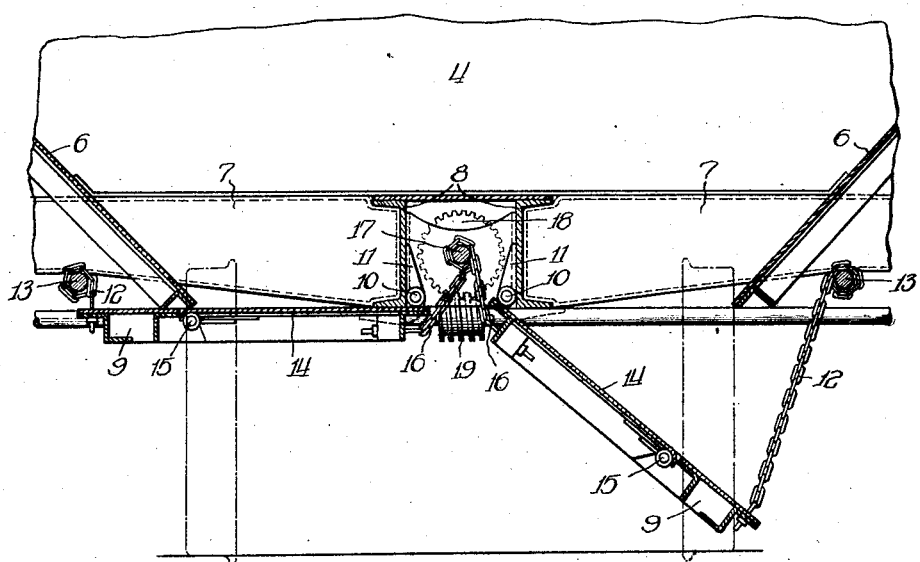
Figure 3 is a view similar to Figure 2, one frame door member being open.

Referring now to Figure 3, the door frame member 14 upon the right side of the car is lowered to the open position by rotating this shaft 13 in the counterclockwise direction. The frame member 9 carries with it the inner member 14. The outer portion of the frame member 9 extends over the rail and effectively directs the material beyond the rail when dumping. Rotating the shaft 13 in the clockwise direction again raises the entire door assembly and closes the floor opening. The door on the left side of the car is operated in a similar manner.

My door construction is composed of but few and rugged parts and is simple in design and effective in operation. While the device has been shown as applied to doors of one particular type of car, it is obviously not limited in its application to cars of that design, but may be applied to swinging doors of any type.

I claim:

1. In a dump car, center sills, a floor having openings either side of said center sills, substantially horizontal doors located substantially in the plane of the lower edges of the center sills and covering the floor openings, the doors consisting of frame members pivoted at one side of said openings and inner members pivoted in the frame members adjacent the opposite side of the floor openings, a longitudinal shaft adjacent the center sills and means connecting said shaft to similar members of the door on either side thereof, shafts adjacent the outer edges of the doors and means connecting said shafts to the remaining door members, each means coacting with its shaft in such manner as to be operated to release or to draw up the door member to which it is connected, when the shaft is rotated.

2. In a dump car, center sills, a floor having openings either side of said center sills, doors covering the floor openings, the doors consisting of frame members pivoted to the lower edges of the center sills and inner members pivoted in the frames adjacent the outer side of the floor openings, a longitudinal shaft adjacent the center sills, and means connecting said shaft to similar members of the door on either side thereof, shafts adjacent the outer edges of the doors, and means connecting said shafts to the remaining door members, each means coacting with its shaft in such manner as to be operated to release or to draw up the door member to which it is connected, when the shaft is rotated.

3. In a dump car, fixed sloping side portions, center sills, a floor having openings either side of said center sills, doors covering the floor openings, the doors consisting of frame members pivoted to the lower edges of the center sills and inner members pivoted in the frames adjacent the outer side of the floor openings, a longitudinal shaft between the center sills, and flexible means connecting the shaft to the free end of each of said inner door members, shafts adjacent the outer edges of the doors, and flexible means connecting said shafts to the free ends of the door frame members, each flexible member coacting with its shaft in such manner as to be operated to release or to draw up the door member to which it is connected, when the shaft is rotated.

4. In a dump car, fixed sloping side portions, a floor having openings therein, substantially horizontal doors covering the floor openings, the doors consisting of frame members pivoted at one side of said openings and inner members pivoted in the frame members adjacent the opposite side of the floor openings, longitudinal shafts adjacent either side of the door frame, one of said shafts being connected by a member to the door frame and the other shaft being connected by a member to the inner door member, each connecting member coacting with its shaft in such manner as to be operated to release or to draw up the door member to which it is connected, when the shaft is rotated, the frame members when released carrying with them in their movement the inner members.

5. In a dump car, fixed sloping side portions, a floor having openings therein, substantially horizontal doors covering the floor openings, the doors consisting of frame members pivoted at one side of said openings and inner members pivoted in the frame members adjacent the opposite side of the floor openings, longitudinal shafts adjacent either side of the door frame, one of said shafts being connected by a member to the door frame and the other shaft being connected by a member to the inner door member, each connecting member coacting with its shaft in such manner as to be operated to release or to draw up the door member to which it is connected, when the shaft is rotated, the release of the inner members serving to discharge material in the car between the rails and the release of the frame member serving to discharge the material outside of the rails.

6. In a dump car, a floor having openings therein, doors covering the floor openings, the doors consisting of frame members pivoted at one side of said openings and inner members pivoted in the frame members adjacent the opposite side of the floor openings, longitudinal shafts adjacent either side of the door frame, one of said shafts being connected by a member to the door frame and the other shaft being connected by a member to the inner door member, each connecting member coacting with its shaft in such manner as to be operated to release or to draw up the door member to which it is connected, when the shaft is rotated, the frame members being greater in area than the opening, the additional area serving when the members are released to guide beyond the rails material passing over the door.

7. In a dump car, fixed sloping side portions, center sills, a floor having openings either side of said center sills, substantially horizontal doors located substantially in the plane of the lower edges of the center sills and covering the floor openings, the doors consisting of frame members pivoted at one side of said openings and inner members pivoted in the frame members adjacent the opposite side of the floor openings, a longitudinal shaft adjacent the center sills, and means connecting said shaft to similar members of the door on either side thereof, the means being so associated with the shaft that rotation of the shaft in one direction releases the door members to which the means are connected on each side and rotation in the opposite direction draws up the door members on each side.

8. A car of the class described having an underframe comprising a center sill, the floor between the trucks having fixed downwardly and inwardly sloping side portions, substantially horizontal doors closing the space between the fixed sloping side portions and the center sill, said doors being hinged to drop away from the side portions and being provided with doors hinged therein and adapted to drop away from the center sill.

Signed at Chicago, Illinois, this 26th day of July, 1921.

HARRY S. HART.